United States Patent [19]

Dvorak et al.

[11] Patent Number: 4,638,133
[45] Date of Patent: Jan. 20, 1987

[54] ROTARY SWITCH ASSEMBLY

[75] Inventors: Robert F. Dvorak, Mount Vernon; Charles E. Netolicky, Cedar Rapids, both of Iowa

[73] Assignee: Square D Company, Palatine, Ill.

[21] Appl. No.: 720,219

[22] Filed: Apr. 5, 1985

[51] Int. Cl.$^4$ .......................... H01H 9/04; H01H 3/08
[52] U.S. Cl. ............................... 200/302.1; 200/293; 200/336; 200/5 A; 200/155 R; 403/361
[58] Field of Search ..................... 200/302.1, 336, 329, 200/316, 159 B, 293, 155 R, 5 A; 16/121, DIG. 30; 74/553; 403/361, 282

[56] References Cited

U.S. PATENT DOCUMENTS

| | | | |
|---|---|---|---|
| Re. 24,046 | 7/1955 | Nathan | 200/302.1 |
| 1,776,615 | 9/1930 | Boothman et al. | 403/361 |
| 2,002,817 | 5/1935 | Johnson | 16/121 |
| 3,147,537 | 9/1964 | Fadow | 403/140 |
| 3,456,227 | 7/1969 | Paine et al. | 200/302.1 |
| 3,501,609 | 3/1970 | Willcox et al. | 200/336 |
| 3,561,287 | 2/1971 | Lawrence, Jr. | 200/336 |
| 3,697,714 | 10/1972 | Gryctoko et al. | 200/302.1 |
| 3,767,880 | 10/1973 | Austin | 200/336 |
| 3,856,998 | 12/1974 | Sims, Jr. | 200/159 B |
| 3,982,081 | 9/1976 | Demler, Jr. | 200/159 R |
| 4,564,732 | 1/1986 | Lancaster et al. | 200/293 |

Primary Examiner—Stephen Marcus
Assistant Examiner—Linda J. Sholl
Attorney, Agent, or Firm—Larry I. Golden; Richard T. Guttman

[57] ABSTRACT

A rotary switch is provided by a molded knob having a circular top portion, a circular bottom portion and a circumferential flange between the top and bottom portion. The bottom portion includes a recess which is provided with a pair of crush ribs provided to secure a rotary switch pin within the recess. A circumferential channel is provided on the flange around the top portion of the knob with a stop tab provided in the channel. The molded knob is operatively associated with a top plate and a bottom plate, each plate including a plurality of apertures which receive a respective top portion of a molded knob. The bottom plate is provided with an offset portion which spaces the apertures in the bottom plate a predetermined distance from the apertures in the top plate, with dimples provided in the bottom plate to maintain a predetermined spacing of the plates at the locations of the apertures. The apertures in the top plate are sized to fit closely around the top portion of the molded knob while the apertures in the bottom plate are sized greater than the dimensions of the apertures in the top plate and less than the dimensions of the circumferential flange, with lock tab of being provided on the bottom plate and extending into each bottom aperture and providing a stop surface against which the stop tab will abut upon sufficient rotation of the knob. The top portion of the knob is provided with a slot which can be operated by a screwdriver or similar tool to move the knob to any of its available positions which is designated by an embossed arrow on the top of the knob.

8 Claims, 8 Drawing Figures

ROTARY SWITCH ASSEMBLY

FIELD OF THE INVENTION

This invention relates to rotary switch assemblies and, more particularly, to an improved design for molded knobs and accompanying switch plates which facilitate operation of rotary switches to selected positions while inhibiting entrance of dirt, dust, etc. to the switch compartment.

BACKGROUND OF THE INVENTION

Electrical distribution and control equipment such as an electronic circuit breaker may utilize several rotary switches to provide a range of adjustment among several functions that are available with the equipment. The functions may include ground fault trip, short time trip and long time trip with adjustable settings for delays and pick-up. The electronic circuit breaker may carry the rotary switches on a circuit board which carries other electrical components relating to the various functions performed by the circuit breaker. It is sometimes desirable to provide a single assembly having a number of rotary switches with the ready capability of accessing any or all of the rotary switches and further with ready means for locking out various positions of each individual switch while inhibiting impurities from entering the circuit board area.

SUMMARY OF THE INVENTION

The present invention is for use in an electronic circuit breaker of the type shown and described in application Ser. No. 720,130 filed concurrently herewith by R. F. Dvorak, C. E. Netolicky and N. R. Palmer for an Improved Button Indicator and Switch Assembly and also as described in copending application Ser. No. 720,235 filed by J. C. Chiang and W. P. Hooper for a Microcomputer—Based Electronic Trip Unit For Circuit Breaker, both of which are assigned to the same assignee as the instant invention and the disclosures of which are hereby incorporated by reference.

The improved rotary switch knob assembly includes at least one molded rotary knob which is provided with appropriate contours, protrusions, indentations and dimensions to cooperate with a conventional rotary switch and a pair of switch plates positioned in generally facing relationship with each other.

The molded knob includes a circular top portion, a circular bottom portion and a circumferential flange between the top and bottom portions. The bottom portion includes a recess which is provided with a pair of crush-ribs that help secure the switch pin within the recess. The flange includes a circumferential channel around its top surface with a stop tab also provided on the flange.

A pair of switch plates are provided which include a top cover plate and a bottom stop plate. Each plate includes a plurality of apertures sized to receive the top portion of the molded knob. Apertures in the cover plate being dimensioned to closely fit the circumference of the top portion of the button, while the apertures in the bottom stop plate are of a greater dimension to overlie most of the channel in the flange in addition to receiving the stop tab. Each of the plates are positioned in facing relationship with their apertures in registration with each other. A portion of the bottom plate is spaced away from the top plate to space the aperture portions of each plate from each other by a predetermined small distance.

It is an object of the present invention to provide a tight fitting, self locating rotary switch knob assembly.

It is a further object of the present invention to provide an economical rotary switch knob assembly which inhibits the entrance of dirt, dust, etc. from entering the interior of a casing.

It is another object of the present invention to facilitate the locking out of selected switches and/or selected switch positions.

A further object of the present invention is to provide an aesthetic, readily operated switch knob assembly.

Further objects and features of the invention will be apparent to those skilled in the art from the following specification including the appended claims and the accompanying Drawings of the invention in which:

DESCRIPTION OF THE PREFERRED EMBODIMENT

Figure 1:
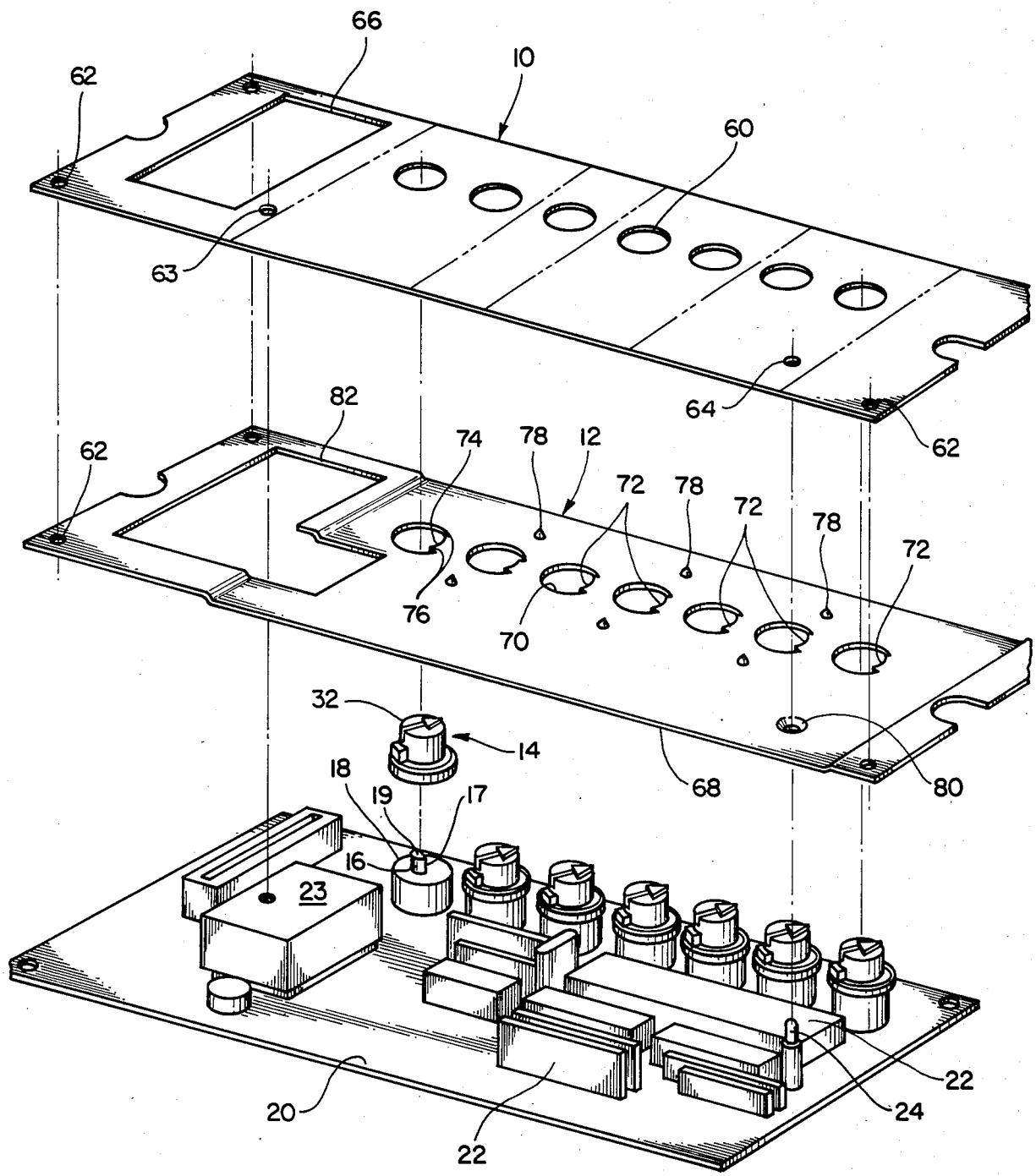
FIG. 1 is an exploded perspective view showing the top and bottom switch plates of the present invention together with a circuit board carrying several rotary switches which include the molded knob of the present invention.
Figure 2:
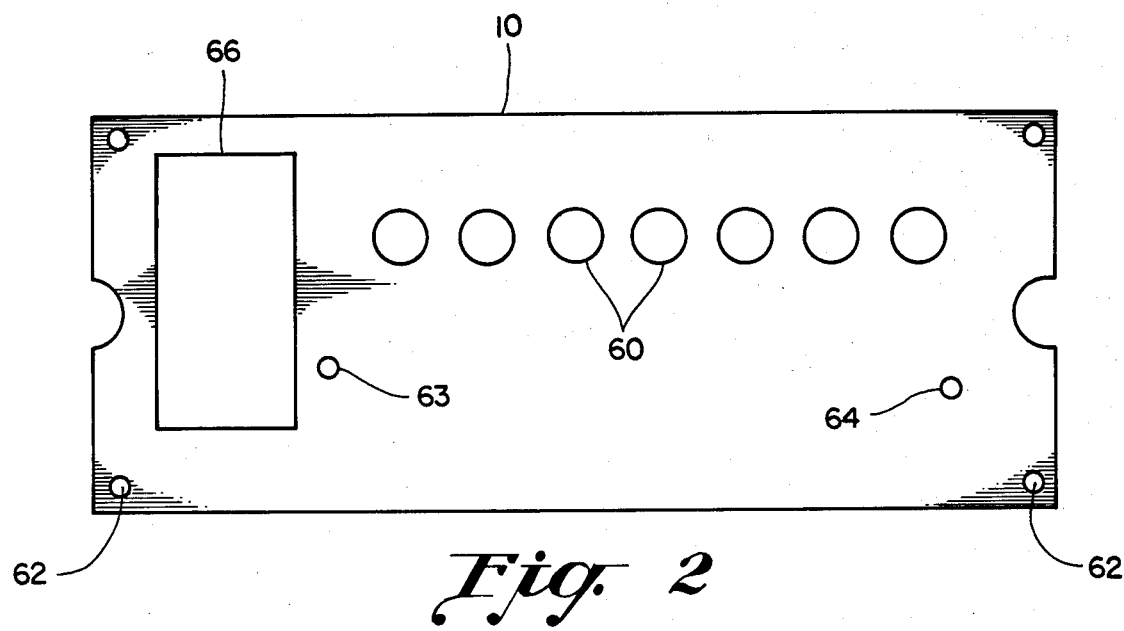
FIG. 2 is a top view of the top switch plate.
Figure 3:
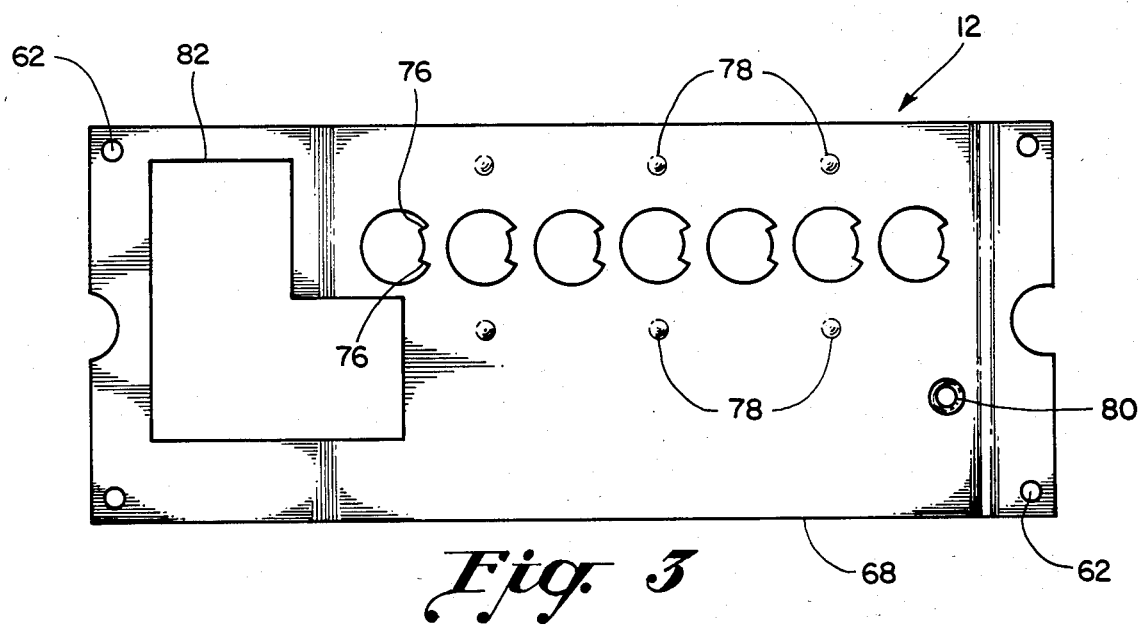
FIG. 3 is a top view of the bottom switch plate.
Figure 4:
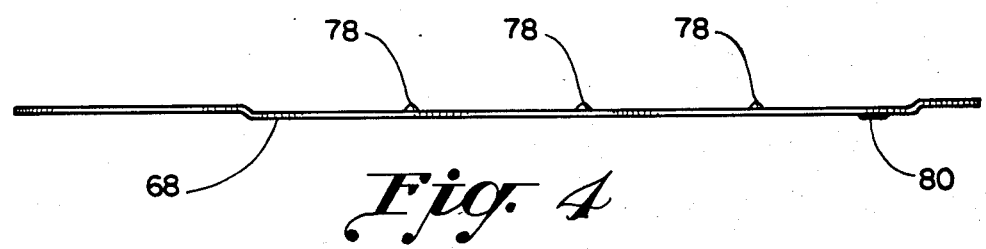
FIG. 4 is a side view of the bottom switch plate.

Referring to FIG. 1 of the Drawings, the rotary switch assembly is shown in exploded perspective view. The assembly includes a top switch plate 10 and a bottom switch plate 12 which cooperate with a plurality of molded knobs 14, each connected to a pin 16 controlling the setting of a respective rotary switch 18.

The plurality of rotary switches 18 are connected to a circuit board 20 of the type shown and described more particularly in the aforereferenced application Ser. No. 720,235 filed by J. C. Chiang and W. P. Hooper which carries various other electrical components 22 which provide for selective setting of various functions of the circuit breaker. An LED 24 is also carried by the circuit board 20 to provide visual indication of a full or overload condition and a heat sink 23, carried by the circuit board, may be connected to the coverplate to provide some heat transfer to the plate.

Figure 7:
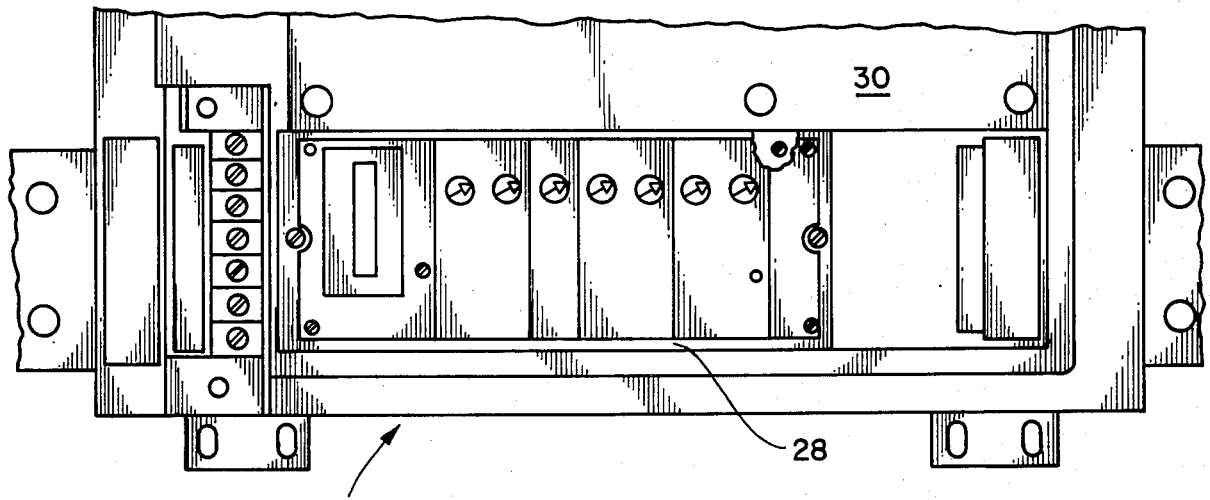
FIG. 7 is a top view showing a circuit breaker incorporating the switch knob assembly of the present invention.

A partial front view of a circuit breaker 26 is shown in FIG. 7 of the Drawings. A window 28 is provided in the cover 30 of the circuit breaker exposing the top plate 10 and facilitating operator setting of selected knobs within a predetermined range as will be hereinafter more fully discussed.

A molded knob includes a generally circular top portion 32 and a circular bottom portion 34 with a circumferential flange 36 between the top and bottom portions.

Figure 5:
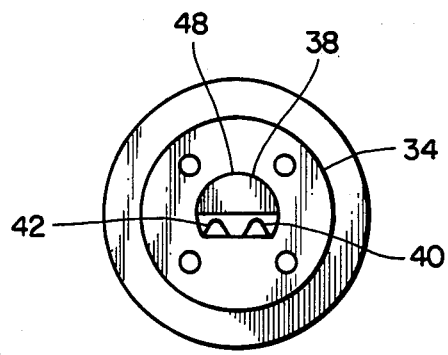
FIG. 5 is a bottom view of the molded knob.
Figure 6:
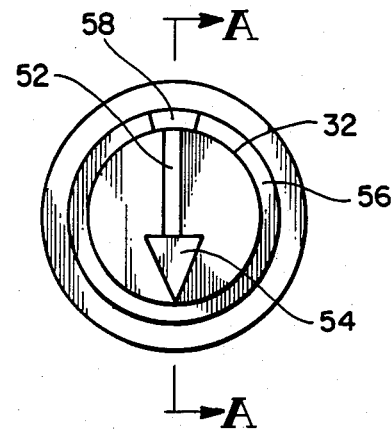
FIG. 6 is a top view of the molded knob.
Figure 6A:
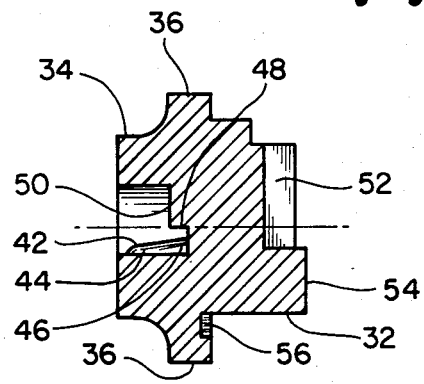
FIG. 6A is a sectional view of the knob taken along the lines A—A in FIG. 6.

The bottom portion includes a generally circular recess 38 as shown in FIG. 5, having a straight side wall 40. A pair of crushed ribs 42 extend into the recess against the side wall 40 as seen in FIGS. 5 and 6A. The top of the crushed rib 44 is formed just inside the recess 38 with the rib tapering outward toward a base portion 46 which is provided in a compartment 48 which is recessed a bit farther than the base 50 of recess 38.

Pin 16 of rotary switch 18, having a substantially semi-circular shape with a straight face portion 17, is force fit within recess 38, with the face portion 17 of the pin shaving portions of the crushed ribs 42 upon insertion. The slightly outward tapering of the crushed ribs 42 from the front portion 44 to the base portion 46 facilitates a secure connection between the knob and the pin. The shaved portions of the ribs drop into compartment 48 which is provided for that purpose since the head 19 of pin 16 is stopped by engagement with the base 50 of recess 38.

The top 32 of knob 14 is provided with a slot 52 extending partially across the top of the knob with a raised arrow 54 provided on the top of the knob. Together, the slot 52 and arrow 54 mark a diameter of the knob with the arrow pointing away from the center of the knob. The arrow can be colored to clearly identify the switch position The flange portion 36 includes a circumferential channel 56 which encircles the top portion 32 of the knob. A stop tab 58 is provided within the channel 56 adjacent the slot 52 on the side opposite from the arrow 54.

While the bottom portion of the knob fittingly receives pin 16 of the rotary switch, the top portion of the knob is operatively associated with the top and bottom switch plates 10 and 12. The top plate 10 which can be seen through the window 28 in the circuit breaker cover, is a generally flat rectangular aluminum plate having a thickness of approximately 0.04 inches and includes a plurality of apertures 60 to snugly receive the top portions 32 of the knob 14. Several mounting holes 62 are provided through which fasteners may be extended to secure the switch plates to inserts (not shown) which may be connected to the circuit breaker cover. An opening 64 is provided in the top plate through which the LED may provide visual indication concerning a particular function of the circuit breaker. The top plate 10 also includes a window 66 providing access to the circuit board to permit connection of an appropriate rating plug. An opening 63 is also provided in the top plate through which a connector may extend to connect the top plate to the heat sink 23.

The bottom plate 12 is also a generally rectangular aluminum plate having a thickness of approximately 0.02 inches and an offset central portion 68 which includes a plurality of generally circular apertures 70 having a slightly greater diameter than the apertures 60 of the top plate 10. The apertures 70 in the bottom plate 12 include a lock tab portion 72 extending into the aperture and positioned on one side of the aperture. The lock tab 72 includes an inner curved surface 74 and opposite side lock surfaces 76 which cooperate with the stop tab 58 of the knob as will hereinafter be described. The top plate 10 is positioned in back-to-back relationship with the bottom plate 12 with offset portion 68 of the bottom plate being spaced away from the top plate 10 by approximately 0.03 inches. A plurality of dimples 78 extend upward approximately 0.03 inches from the offset portion towards the top plate 10 in the vicinity of the apertures to maintain sufficient minimal spacing between top plate 10 and bottom plate 12 where the apertures are located. A downwardly embossed opening is positioned to be in registration with opening 64 and positioned to receive the top portion of the LED 24. The bottom plate also includes a window 82 which is aligned with the window 66 of the top plate 10, permitting access to change a rating plug which may be carried by the circuit board 20.

After a force fit of the molded knob on the pin 16 is obtained as previously described, the bottom plate 12 is positioned above the circuit board 20 with the top portion 32 of the knob extending through the aperture 70. The diameter of aperture 70 being such that the aperture extends circumferentially around the circular channel 56 provided in the knob. Lock tab 72 extends inward, covering a portion of the channel 56 and providing a stop surface for stop tab 58 at each side surface 76. The inner surface 74 of the lock tab is generally in close fitting relationship with the top portion 32 of the knob and substantially aligned in registration with the apertures 60 of the top plate 10 which is positioned against the bottom plate 12. Both the top and bottom plates are connected to the cover of the circuit breaker by conventional means.

While the apertures 60 in the top plate 10 are sized to fit closely around the top portion of the knob, there remains room for dust and other impurities to enter between the knob and the top plate 10. The channel 56 is provided to retain any such impurities, inhibiting such particles from moving past the flange portion 36 to prevent contamination within the circuit board area.

The top plate may be marked to identify the position of each of the switches or covered by an overlay which has been premarked to identify the switch positions. p It should be understood that the stop tab portions 58 and lock tab portions 72 may be sized and positioned in accordance with the desired availability of switch positions to an operator. If it is desired that a particular function not be provided, or that operator selectivity not be provided for a particular function, the rotary switch 18 may be set in a locked out or other predetermined position and the rotary switch assembly provided without a knob 14 for the particular switch 18, permitting use of a pair of switch plates 10 and 12 without respective apertures 60 and 70 for any such designated switches.

While the invention has particularly been shown and described with reference to a preferred embodiment, it will be understood by those skilled in the art that variations in form, construction and arrangements may be made therein without departing from the spirit and scope of the invention. All such variations are intended to be covered in the appended claims.

We claim:

1. A rotary switch assembly used for operating a rotary switch having a pin rotatable among a plurality of selectable positions, said assembly comprising:

a knob having a top portion, a bottom portion and a circumferential flange intermediate said top portion and said bottom portion;

said bottom portion including a generally circular recess extending toward said top portion and having a straight side wall and a base, said recess shaped and dimensioned to receive and encircle said pin, said side wall including a crush rib extending into said recess toward said top portion adapted to be shaved in response to insertion of said pin into said recess; and a compartment provided within said recess for receiving said shaved portions of said crush rib, said compartment partially defined by said side wall and recessed further than said base.

2. A rotary switch assembly as claimed in claim 1 including a circumferential channel provided in said flange adjacent said top portion of said knob;

said channel including an outer wall defining a first imaginary cylinder and an inner wall defining a second imaginary cylinder co-extensive with the top portion of said knob;

a bottom plate positioned above said flange and including a bottom aperture receiving said top portion of said knob, said bottom aperture defining a third imaginary cylinder intermediate said first imaginary cylinder and said second imaginary cylinder; and a top plate including a top aperture encircling said top portion of said knob in close relationship with said knob.

3. A rotary switch assembly as claimed in claim 2 wherein said flange includes a stop tab provided in said channel and said bottom plate includes a lock tab extending into said aperture and overlaying said channel, said lock tab preventing complete rotation of said knob within said aperture as a result of contact between said stop tab and said lock tab.

4. A rotary switch assembly as claimed in claim 3 wherein said bottom aperture is carried on an offset portion of said bottom plate, said top plate positioned in engagement with said bottom plate with said offset portion spaced a predetermined distance away from said top plate.

5. The rotary switch assembly as claimed in claim 4 wherein said offset portion includes a plurality of dimples extending said predetermined distance from said bottom plate to said top plate.

6. A rotary switch assembly used for operating a plurality of rotary switches, each switch having a pin rotatable among a plurality of selectable positions, said assembly comprising;

a knob provided for each switch which will be user operated, each knob having a generally circular top portion, a generally circular bottom portion and a circumferential flange intermediate said top portion and said bottom portion, said bottom portion including receiving means for receiving said pin;

a thin bottom plate positioned over said knobs, said bottom plate having a slightly offset portion including a plurality of bottom apertures respectively receiving said top portion of a respective knob, said bottom plate including a lock tab extending into each said aperture towards the top portion of said knob, a thin, generally flat top plate including a plurality of apertures respectively aligned in registration with said bottom apertures and encircling said top portion of a respective knob in substantially close relationship with said knob; a plurality of dimples spacing said offset portion of said bottom plate from said top plate; and a stop tab provided on said flange and operably associated with said lock tab to prevent the complete rotation of said knob within said bottom apertures.

7. A rotary switch assembly as claimed in claim 6 wherein said flange includes a circumferential channel, and said lock tab overlays a portion of said channel.

8. A rotary switch assembly as claimed in claim 7 wherein said receiving means includes a recess formed in said bottom portion shaped and dimensioned to receive said pin, said recess including a crush rib adapted to be shaved in response to insertion of said pin into said recess; and a compartment provided within said recess for receiving said shaved portions of said crush rib.

* * * * *